No. 796,283.   PATENTED AUG. 1, 1905.
A. H. BARKER.
APPARATUS FOR HEATING WATER AND CIRCULATING THE HEATED WATER
BY MEANS OF STEAM.
APPLICATION FILED AUG. 27, 1904.

3 SHEETS—SHEET 3.

Witnesses
Arthur Henry Barker.
Inventor

UNITED STATES PATENT OFFICE.

ARTHUR HENRY BARKER, OF TROWBRIDGE, ENGLAND.

APPARATUS FOR HEATING WATER AND CIRCULATING THE HEATED WATER BY MEANS OF STEAM.

No. 796,283. Specification of Letters Patent. Patented Aug. 1, 1905.

Application filed August 27, 1904. Serial No. 222,439.

*To all whom it may concern:*

Be it known that I, ARTHUR HENRY BARKER, a subject of the King of Great Britain and Ireland, residing at Trowbridge, in the county of Wilts, England, have invented a new and useful Apparatus for Heating Water and Circulating the Heated Water by Means of Steam, of which the following is a specification.

This invention relates to apparatus in which water is heated by steam and caused to circulate through any system of closed pipes by means of steam, the objects of the invention being to utilize the steam economically, to obtain a gentle steady flow in the circulating-pipes, and to enable the heating and the circulation to be carried on quite automatically and independently the one of the other. I attain these objects by means of apparatus comprising a system of circulating-pipes through which the heated water is circulated, a pressure-reservoir situated at or above the highest level of said system of pipes, a receiving vessel situated at the lower end of said system of pipes and provided with a float-actuated valve controlling the admission of water to this vessel from said system of pipes, thereby relieving the pressure at the lower end of said system of pipes and permitting the water to flow downward through said pipes, a float-controlled steam pump or ejector to force or lift the water from the receiving vessel to said pressure-reservoir, a discharge-pipe leading from said pump to said pressure-reservoir, and a heating vessel provided with means for heating the water by steam or otherwise.

The position of the heater in the apparatus is immaterial. It may, for example, be situated in the line of either the discharge-pipes or of the circulating-pipes, or it may be combined in one with the receiving vessel or pump.

The form of the steam pump or ejector is not material. It may either have steam and water pistons and cylinders or so that the steam acts directly on the surface of the water.

Such apparatus is illustrated by the accompanying drawings.

Figure 1:
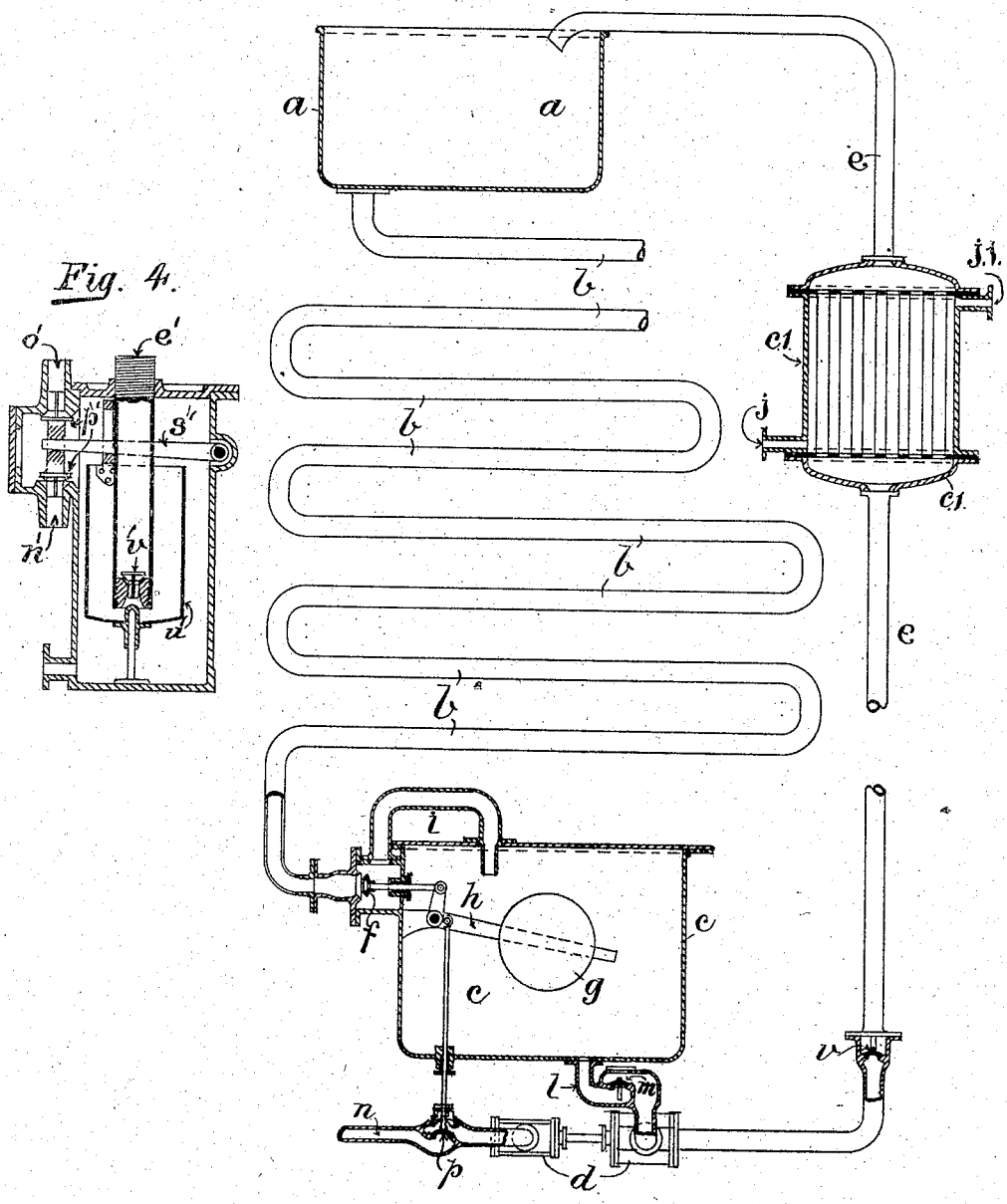
Figure 2:
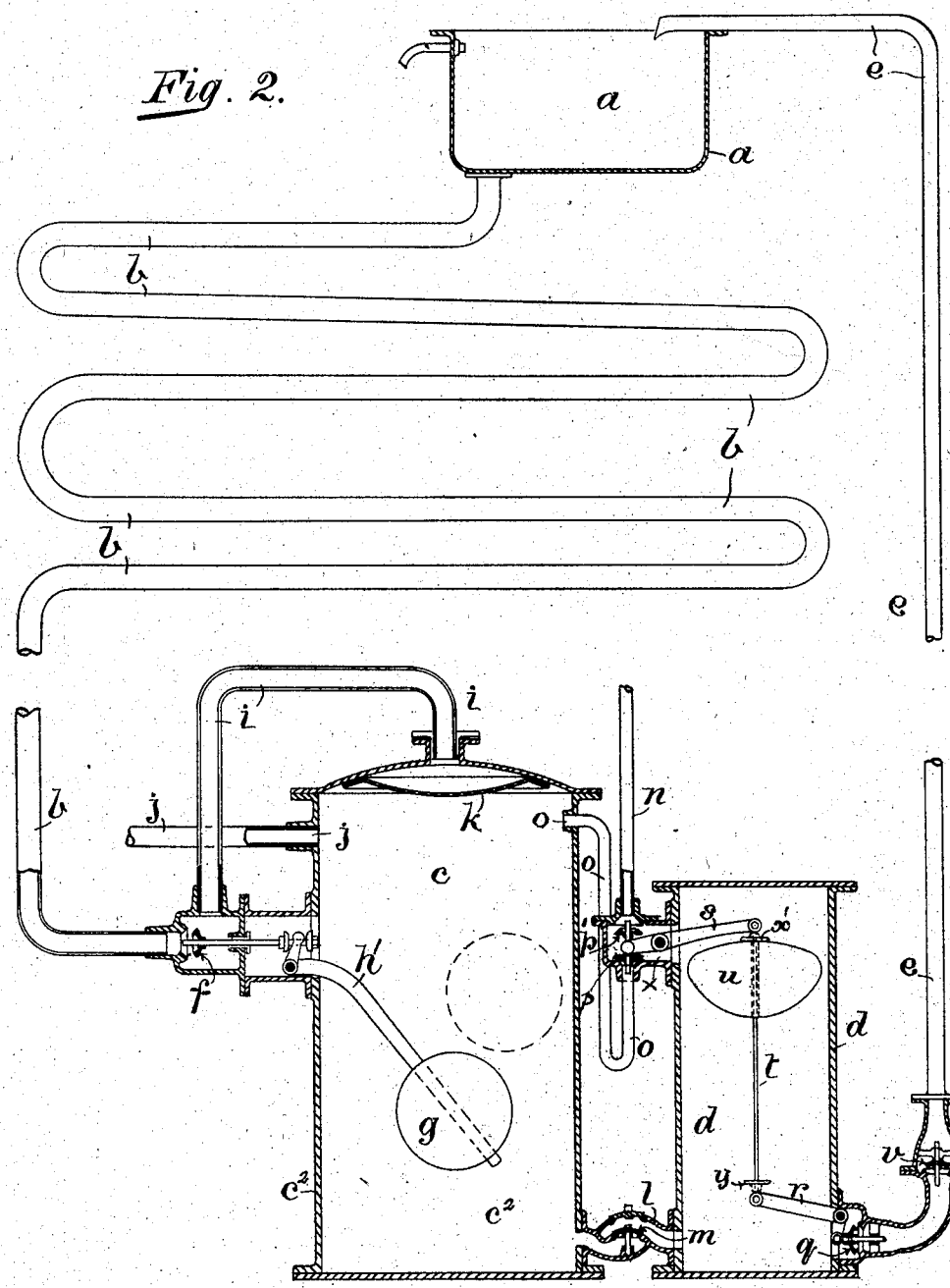
Figure 3:
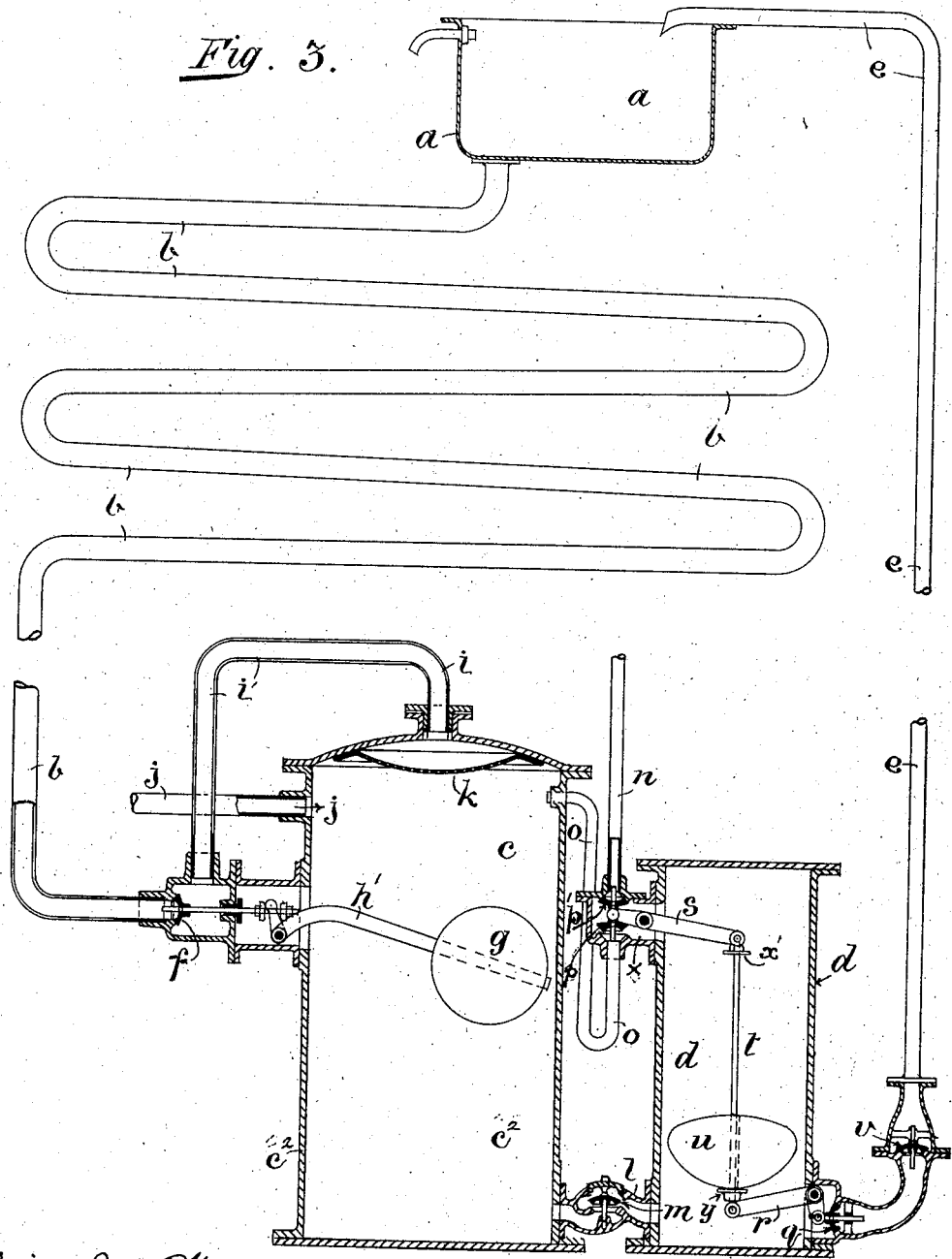

Figure 1 shows the case where the heater is situated in the line of said discharge-pipe and with a steam-pump provided with steam and water cylinders and pistons. Fig. 2 shows the apparatus with the receiving vessel and the heater combined in one and with the pump arranged so that the steam acts directly on the surface of the water to cause its expulsion. Fig. 3 is a similar view to Fig. 2, but with the steam-controlling valve and the water-admission valve in the opposite positions. The position of the one valve, however, is independent of that of the other valve. Fig. 4 shows the pump illustrated in Figs. 2 and 3, but in which a bucket form of float is used.

In all the figures the same reference-letter refers to the same or corresponding parts.

$a$ indicates the pressure-reservoir; $b$, the circulating-pipes.

$c$, Fig. 1, is the receiving vessel.

$d$ indicates the pump, and $e$ is the discharge-pipe or rising-main.

In Fig. 1, $c'$ indicates the heating vessel, which may be of tubular or any other convenient type, $j$ and $j''$ being the steam inlet and discharge pipes. In Figs. 2 and 3 the receiving vessel $c^2$ is also used as the heating vessel.

For the purpose of showing that the type of heater is not material to the invention the means for heating the water (shown in Figs. 2 and 3) consist in a steam-pipe $j$, admitting, preferably, low-pressure steam to fill the upper part of the vessel $c^2$, while the water is admitted from the pipe $i$ over the perforated plate $k$, so as to distribute the water in its fall through the steam, and thus facilitate the heating.

$f$ is a valve controlling the admission of water to the receiving vessel $c$ or $c^2$, being automatically operated—that is, closed and opened from the float $g$ through the lever $h$ of Fig. 1 or $h'$ of Figs. 2 and 3 and connections—by the rise and fall of the water in the vessel $c$ or $c^2$.

$l$ is a pipe connecting the pump $d$ with the lower part of the receiving vessel $c^2$, and which is provided with a non-return valve $m$.

$n$ is a pipe leading steam, preferably of a higher pressure than that supplied by the pipe $j$, to the pump $d$. In Fig. 1, $p$ is a valve, and $p'$ is a double valve or a pair of valves in Figs. 2, 3, and 4 controlling the supply of such steam, and which is automatically operated—that is, opened and closed by the rise and fall of the water to predetermined levels through the float $g$, lever $h$, and connections in Fig. 1 and through the float $u$ and lever $s$, Figs. 2 and 3.

In Figs. 2 and 3 the steam-pipe $n$ communicates with the pump vessel $d$ through a chamber $x$. An equilibrium-pipe $o$ joins the heating vessel $c$ to the pump vessel by means of the same chamber. Within the chamber are valves $p\ p'$, governing, respectively, the pipe $o$ and the pipe $n$. These valves are mounted on a single stem and alternately open and close the pipes $o$ and $n$ under the operation of the lever $s$, moved by the float $u$. The object of this device is to restore equilibrium of the steam-pressures in the vessels $d$ and $c$ immediately the water has been expelled from the former.

In Figs. 2 and 3, $t$ is a guide-rod for the float $u$, attached to the lever $s$ and carrying the stops $x'$ and $y$, against which the float $w$ strikes. $v$ is a non-return valve at the bottom of the discharge or rising pipe $e$.

The working of the apparatus is as follows: When the level of the water in the receiving vessel $c$ falls sufficiently, the water-inlet valve $f$ is opened by the fall of the float $g$. As long as the pressure of the water on this side of the valve $m$ is greater than on the pump side water flows through the pipe $l$ to the pump, collecting in the pump vessel or chamber $d$ till it lifts float $u$ sufficiently to open communication between high-pressure steam-pipe $n$ and the said chamber. The steam thus admitted forces water out of said pump-chamber through rising-pipe $e$ until the water-level is so far lowered that the said float falling with it closes steam-pipe $n$. Thereupon the condensation of steam tends to create a partial vacuum in said chamber, causing an undesirable rush of water into it from receiving-chamber $c$; but the float $u$ simultaneously with such closing of pipe $n$ opens comunication between the upper parts of vessels or chambers $c$ and $d$ through equilibrium-pipe $o$, relieving or preventing such vacuum. The steam operates the pump $d$ to force the water up the discharge-pipe $e$ to the pressure-reservoir $a$. From the pressure-reservoir $a$ the water flows slowly and gently under a steady pressure through the system of pipes back to the receiving vessel. This flow is only checked when the water reaches a sufficient height in the receiving vessel to enable the float $g$ to close the valve $f$.

As high-pressure steam can be used for the pump only and low-pressure steam for heating, the steam is utilized economically.

As the flow of the water in the circulating-pipes $b$ is quite independent of the action of the pump $d$ and there is relatively little variation in the head or pressure tending to force the water through the pipes $b$, the water circulation in these pipes is gentle and steady. Also, although for the sake of clearness in the drawings a considerable range of movement of the float $g$ has been shown, this will be relatively small if the capacity of the receiving vessel $c^2$ is great compared to the capacity of the pump.

In Fig. 4 the float $u'$ is of bucket form with elongated sides, and the pipe $e'$, corresponding to pipe $e$, hereinbefore described, extends down into it, a valve $v'$ in the bottom of this pipe governing communication between the interiors of said parts and corresponding in function to valve $v$, before mentioned. The lever $s'$, corresponding to aforesaid lever $s$, is pivoted at one end instead of at an intermediate point, as in the case of the latter. The pipe $o'$, corresponding to the aforesaid pipe $o$, enters from above and the pipe $n'$, corresponding to $n$, from below. These pipes are governed by valves $p'$, as before stated, and with the above exceptions the construction and operation of the various parts are as stated with regard to Figs. 2 and 3.

I am aware that prior to this invention water-heaters and hot-water circulators have been made comprising steam and water admission valves operated through float-actuated mechanism and with non-return valves and a supply of steam at two different pressures. I do not, therefore, claim such broadly; but What I do claim as my invention, and desire to secure by Letters Patent, is—

1. In apparatus for heating and circulating water by means of steam, a water-receiving vessel $c$, a pipe $b'$ supplying the same and forming part of the water-circulating circuit, a valve between said pipe and said receiving vessel, a pump supplied with water from said receiving vessel, a steam-supply valve for said pump, float-actuated means for controlling said valves, a discharge-pipe from the pump, means for conveying water from said discharge-pipe to pipe $b'$, completing the circuit, and means for heating the water.

2. In apparatus for heating and circulating water by means of steam, the combination of a series of circulating-pipes with a pressure-reservoir situated at or above the highest part of said series of pipes, a receiving vessel situated at the lower end of said series of pipes, a valve between the said pipes and receiving vessel, a pump, a steam-supply valve for the pump, float-actuated means for controlling said valves, a discharge or riser pipe leading from the pump to the pressure-reservoir and means for heating the water substantially as set forth.

3. In apparatus for heating and circulating water, the combination of a series of circulating-pipes, a pressure-reservoir at the upper end of said series of pipes, a receiving vessel, a water-admission valve controlling the inlet from the lower end of said pipes to said vessel, a pump provided with a valve controlling the supply of steam for operating said pump, and a float in said vessel with connections to said admission and steam valves substantially as set forth.

4. In apparatus for heating and circulating water, the combination of a series of pipes with a pressure-reservoir at the upper end of said pipes, a receiving vessel, a valve controlling the inlet to said vessel from the lower end of said series of pipes, a float in said vessel operating said valve, a pump vessel, a pipe connecting said pump vessel to the lower part of said receiving vessel, a non-return valve in this pipe, a valve controlling admission of high-pressure steam to said pump vessel, a float in said pump vessel operating the latter valve, means for supplying low-pressure steam to the receiving vessel to heat the water therein and a riser or discharge pipe leading from the pump to the pressure-reservoir substantially as set forth.

ARTHUR HENRY BARKER.

Witnesses:
CLIFFORD JOHN OPPER,
FRANK WILKINS KEMP.